United States Patent [19]

Onoda et al.

[11] Patent Number: 4,607,265

[45] Date of Patent: Aug. 19, 1986

[54] PEN-RECORDING APPARATUS

[75] Inventors: Hiroshi Onoda; Kenji Mizuno, both of Nagoya, Japan

[73] Assignee: Brother Kogyo Kabushiki Kaisha, Aichi, Japan

[21] Appl. No.: 663,330

[22] Filed: Oct. 18, 1984

[30] Foreign Application Priority Data

Oct. 28, 1983 [JP] Japan .............................. 58-203198

[51] Int. Cl.$^4$ ............................................ G01D 15/16
[52] U.S. Cl. ................................. 346/139 R; 400/210
[58] Field of Search ..................... 346/139 R; 400/210

[56] References Cited

U.S. PATENT DOCUMENTS 3,761,950  9/1973  Yeiser ................................. 346/134
4,388,005  7/1983  Wehking ............................ 400/210
4,436,441  3/1984  Robert ................................ 400/210

FOREIGN PATENT DOCUMENTS 56-136370 10/1981 Japan ................................. 400/210

Primary Examiner—E. A. Goldberg
Assistant Examiner—Mark Reinhart
Attorney, Agent, or Firm—Parkhurst & Oliff

[57] ABSTRACT

A pen-recording apparatus capable of recording not only regular letters, but also special letters each of which consists of the regular letters slightly shifted relative to each other. The apparatus comprises a platen supported rotatably to hold a sheet of paper, a pen movable along the platen, a platen drive to rotate the platen, and a pen drive to move the pen. The apparatus further comprises a primary control device for controlling the platen and pen drives to cause movements of the pen and the sheet of paper relative to each other for writing on the paper a first element which is the regular letter, and a secondary control device for controlling the drives, after completion of writing of the first element, to bring the pen to a starting position of a second element which is the same regular letter as the first element, the starting position of the second element being shifted by a predetermined distance from that of the first element in a selected direction.

13 Claims, 14 Drawing Figures

PEN-RECORDING APPARATUS

BACKGROUND OF THE INVENTION

The present invention relates to a pen-recording apparatus, and in particular to the pen-holder type recording apparatus for forming a letter by giving a relative mutual movement of a pen and a platen.

In the past, such pen-recording apparatus was able to record only one kind of ordinary regular letters 1 as shown in FIG. 1(a) and could not record bold letters 2 or shadow letters 3, 4, 5 on a sheet of paper, etc. as shown in FIGS. 1(b)–(e).

Accordingly, only simple ordinary regular letters 1 could be recorded on the paper by the conventional pen-recording apparatus.

SUMMARY OF THE INVENTION

The present invention is intended to solve the above-mentioned problem and it is an object of the present invention to offer a pen-recording apparatus wherein letters can be recorded in plural kinds of different types on a printing paper.

According to the invention, there is provided a pen-recording apparatus which records not only regular letters, but also special letters each of which consists of the regular letters slightly shifted relative to each other, comprising: (a) a platen supported on a frame to hold a printing sheet of paper; (b) a pen movable in an axial direction of the platen; (c) driving means for feeding the sheet of paper; (d) pen moving means for moving the pen in said axial direction; (e) primary control means for controlling the platen driving means and the pen moving means to cause movements of the pen and the sheet of paper relative to each other for writing on the sheet of paper a first element which is the regular letter; and (e) secondary control means for controlling the platen driving means and the pen moving means, after completion of writing of the first element, to bring the pen to a starting position of a second element which is the same regular letter as the first element, the starting position of the second element being spaced or shifted by a predetermined distance from that of the first element.

According to one form of the invention, the predetermined distance betweeen the starting positions of the first and second elements is not greater than a thickness of a line drawn by said pen. In this case, the first and second elements cooperate to constitute a special letter in the form of a bold letter having a thickness larger than that of the regular letter.

According to another form of the invention, the above predetermined distance is greater than a thickness of a line drawn by said pen. In this case, the first and second elements cooperate to constitute a special letter in the form of a shadow letter wherein the first and second elements are at least partially superposed on each other.

In accordance with a further form of the invention, after completion of writing of the first and second elements as a first special letter under control of the primary and second control means, the primary control means starts controlling the operation of the platen driving means and the pen moving means to write the first element of a next special letter adjacent to the first special letter.

According to one advantageous embodiment of the invention, the pen-recording apparatus further comprises direction selector means for selecting one of plural directions in which the starting position of the second element is shifted or spaced from that of the first element.

In accordance with one preferred form of the above embodiment, the above-indicated plural directions consist of eight directions having angular intervals of 45 degrees with respect to the starting position of the first element.

According to another embodiment of the invention, the pen-recording apparatus further comprises shift-distance selector means for selecting said predetermined distance from among plural values.

In accordance with one preferred form of the invention, the above-indicated shift-distance selector means comprises at least one distance selecting key to select the predetermined distance between the starting positions of the first and second elements of the special letter, and the direction selector means comprises plural direction selecting keys corresponding to said plural directions of shift of the starting position of the second element from that of the first element, the plural direction selecting keys being disposed around said at least one distance selecting key.

BRIEF DESCRIPTION OF THE DRAWINGS

The above and other objects, features and advantages of the present invention will become more apparent from reading the following description of the preferred embodiment taken in connection with the accompanying drawings in which.

DETAILED DESCRIPTION OF THE PREFERRED EMBODIMENT

Figure 1:
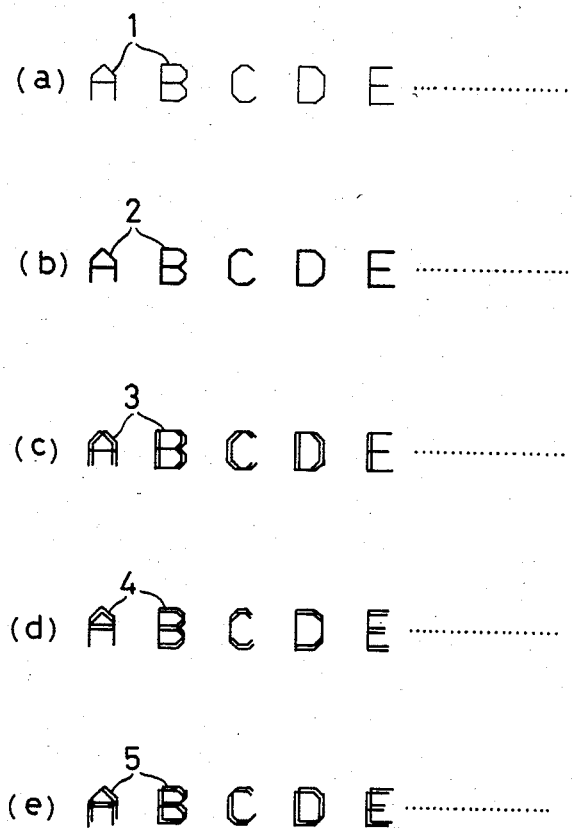
FIGS. 1(a)–(e) are illustrations of different types of each letter.

Reference is now made to the drawing which illustrates a pen-recording apparatus of the present invention.

Figure 2:
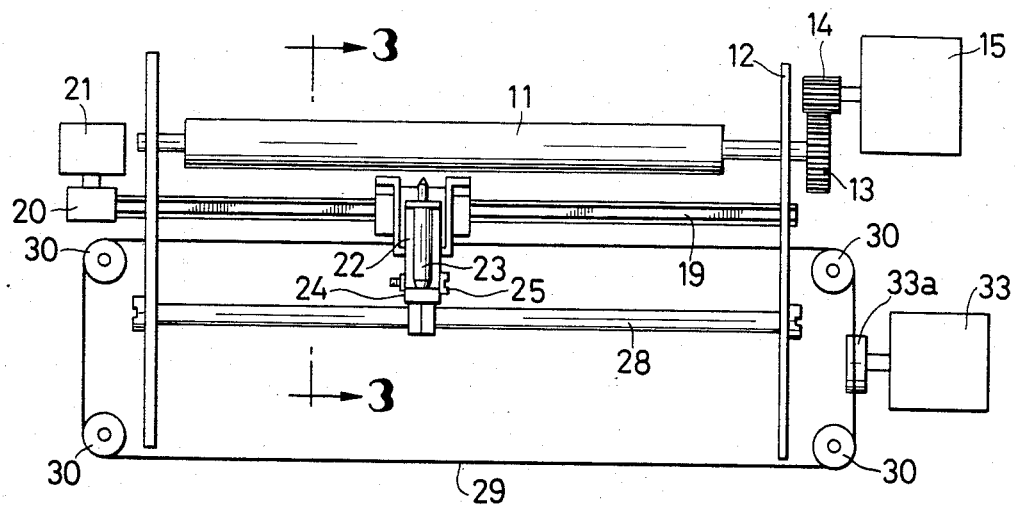
FIG. 2 is a plan view showing essential parts of a pen-recording apparatus embodying the present invention.

In FIG. 2, a platen 11 is rotatably supported at both its ends by a frame 12 of the pen-recording apparatus, while one end thereof is operatively connected through the gears 13 and 14 to a first stepper motor 15 which serves as platen driving means. The platen 11 which is rotated in forward and reverse directions by the stepper motor 15 controls feeding of the printing paper 18 in cooperation with a feed roller 17 (FIG. 3) protruding through a through hole formed on a paper guide plate 16 provided beneath the platen 11.

A guide shaft 19 having opposite flat faces extending in the axial direction is supported rotatably by the frame 12 at both ends with one end thereof being operatively connected to a solenoid 21 through a crank 20. The guide shaft 19 is controlled for its rotation within an angular range (to be described later) by the crank 20 which is driven by the solenoid 21.

Figure 3:
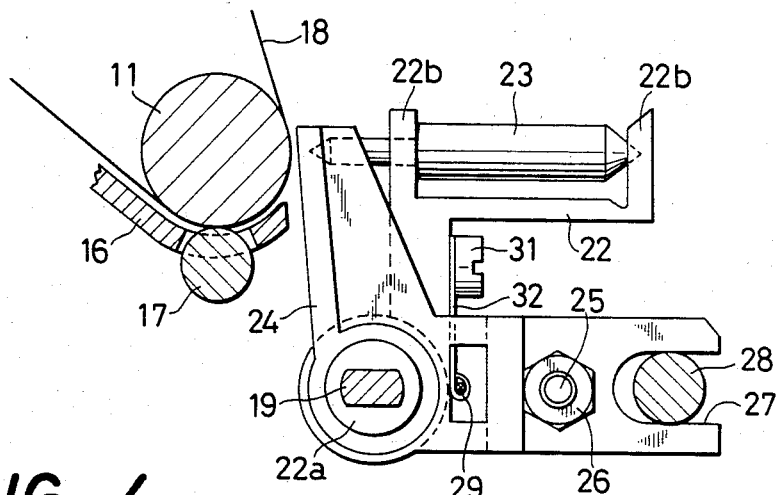
FIG. 3 is a side view in cross section along line 3—3 of FIG. 2.

As shown in FIG. 3, a pen-holder 22 has a boss 22a at its lower part. The boss 22a extends on both sides of the pen-holder 22, and is disposed such that it is not rotatable but axially slidable relative to the guide shaft 19 above-mentioned. A ball-point pen 23 is mounted on a pair of support arm 22b provided on the upper front and rear parts of the pen-holder 22. The pen-holder 22 is pivoted about the guide shaft 19 through rotation of the guide shaft 19, that is by energization and deenergization of the solenoid 21, whereby the ball-point pen 23 is moved between a standby writing position shown in FIG. 3 and a writing position at which the pen 23 contacts the printing paper 18 on the platen 11.

A pair of right and left paper holders 24 are mounted rotatably on an outer circumference of the boss 22a, to support the printing paper 18 at its upper front portion and prevent the printing paper 18 on the platen 11 from springing back toward the pen-holder 22. Rear side parts of the paper holders 24 are formed in L-letter shape and mutually coupled and secured by a bolt 25 and a nut 26, so as to sandwich the pen-holder 22 at front side parts of the paper holders 24.

Further, the pair of paper holders 24 is provided at its rear end with a mating slot 27 which slidably engages a shaft 28 that is supported on the frame 12 so that it extends in parallel with the guide shaft 19. Accordingly, even if the pen-holder 22 is pivoted by the guide shaft 19, the paper holders 24 are held in the state shown in FIG. 3 by the shaft 28.

A wire 29 which moves the pen-holder 22 along the guide shaft 19 in both right and left directions is stretched in a loop such that it is guided by four pulleys provided outside the frame 12. The wire 29 is fixed to a wire holder 32 secured on the rear side of the pen-holder 22 by means of a screw 31. The wire 29 is wound on a pulley 33a fixed on the driving shaft of a second stepper motor 33 as pen moving means, whereby the pen-holder 22 and paper holders 24 are movable in both directions along the guide shaft 19 by the wire 29 when the stepper motor 33 is operated in the appropriate directions. Accordingly, the ball-point pen 23 can write various kinds of letters on the printing paper 18 on the platen 11 by the relative movements of the pen-holder 22 and the platen 11.

Figure 4:
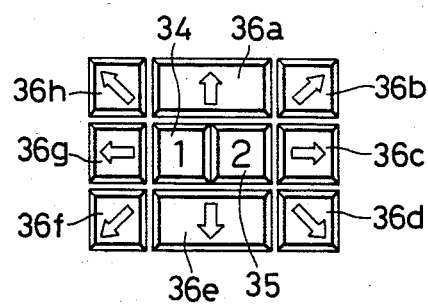
FIG. 4 is a plan view of selection keys.

In FIG. 4, first and second shift distance selection keys 34, 35 arranged on the operation panel (not illustrated) are used when it is desired to write on the paper 18 special letters such as the bold letters 2 shown in FIG. 1(b) or the shadow letters 3, 4, 5 shown in FIGS. 1(c)-(e). Each of the bold and shadow letters 2, 3, 4, 5 comprises a first element which is the regular letter 1 written by a predetermined starting position, and a second element which is the regular letter whose starting position is shifted from the predetermined position of the first element. The first shift distance selection key 34 is used to shift the second element by a predetermined pitch (in this embodiment 0.2 mm, that is, a thickness of a line written by the ball-point pen 23), and a second shift distance selection key 35 is used to shift the second element by 2 pitches (0.4 mm in this embodiment). Direction selection keys 36a-36h are provided around the shift distance selection keys 34, 35 and used to select the directions in which the second element is shifted. The shifting of the second element may be effected in one of eight directions of angular intervals of 45° with respect to the starting position of the first element. The selection keys 36a-36h are arranged to correspond with the respective directions.

Reference is now made to an electric circuit of the pen-recording apparatus constructed as mentioned above.

Figure 5:
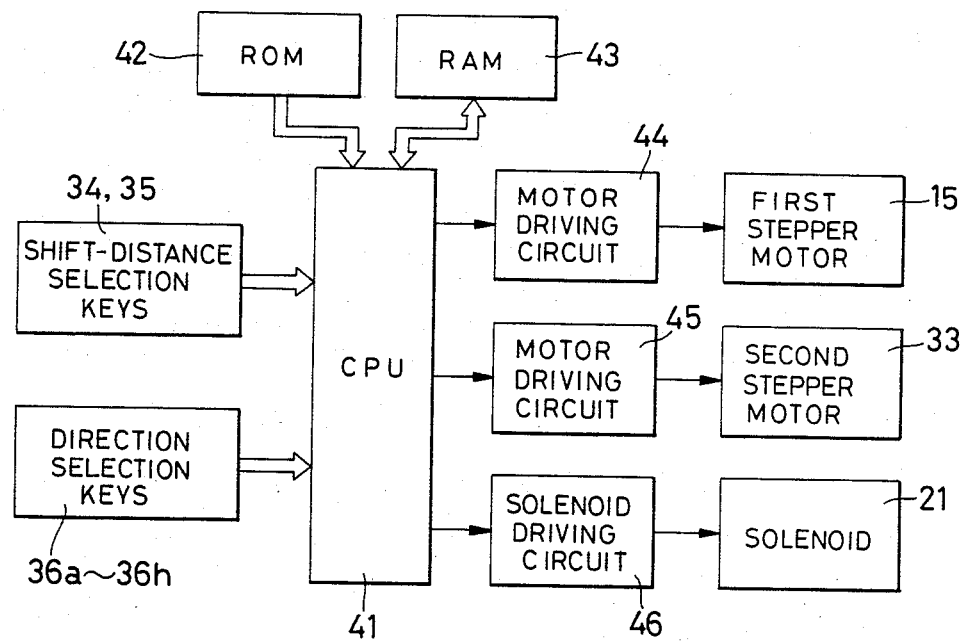
FIG. 5 is a schematic block diagram of an electrical circuit of the pen-recording apparatus.

In FIG. 5 a central processing unit (hereinafter called CPU) 41 constitutes the first and second control means in cooperation with a read only memory (hereinafter called ROM) 42 and a random-access-memory (hereinafter called RAM) 43. The CPU 41 operates in accordance with a control program stored in the ROM 42.

In the RAM 43 are stored document data representing a document to be written on the printing paper 18. In this embodiment, document data are transferred from a floppy disk (not illustrated), in which the document data of a desired document was entered.

The CPU 41 sends an output signal for driving and controlling the stepper motors 15, 33 through respective motor driving circuits 44, 45 so as to enable documents represented by the document data in the RAM 43, to be written in the bold letter 2 or the shadow letters 3, 4, 5 as shown in FIGS. 1(b)-(e) on the printing paper 18, according to an ON signal from the direction selection keys 36a-36h and with the ON signal from the first or second shift distance selection keys 34, 35. Further, the CPU 41 is adapted to send a control signal to a solenoid driving circuit 46 to control the excitation of the solenoid 21.

Figure 6:
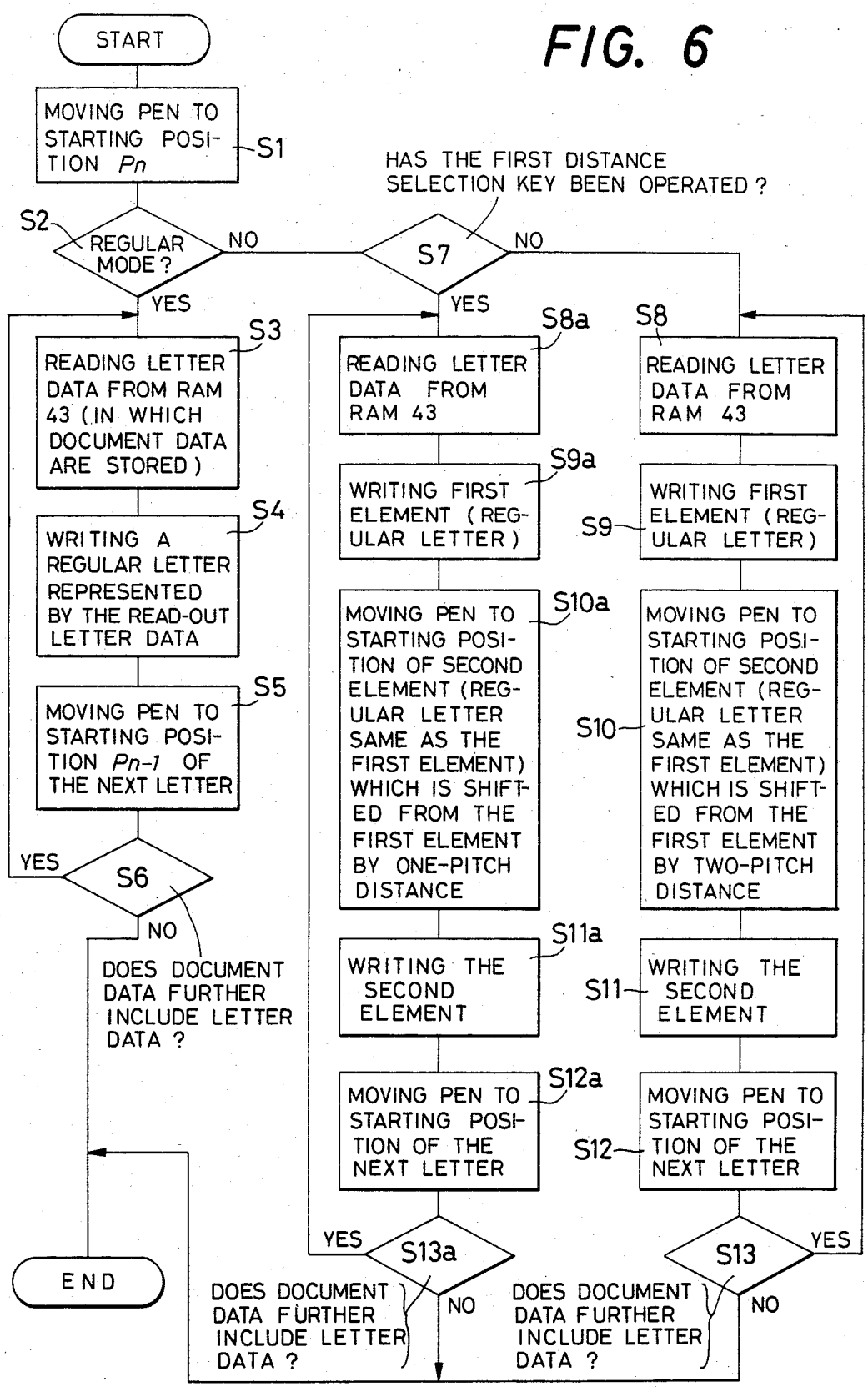
FIG. 6 is a flow-chart diagram showing events of writing operation.

Reference is made next to an operation of the pen-recording apparatus constructed as mentioned above in accordance with a flow chart diagram in FIG. 6 showing a processing operation of the CPU 41.

Figure 7:
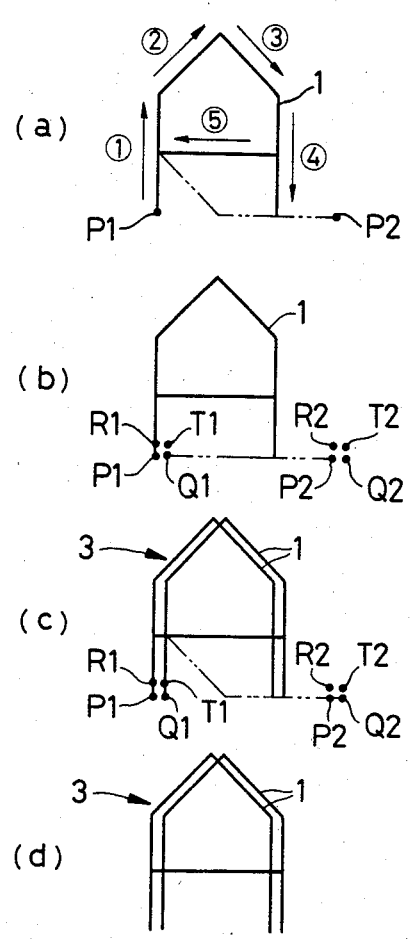
FIGS. 7(a)–(d) are views illustrating the sequences of writing the different types of letters.

Description will be made hereinafter to illustrate a writing operation wherein a document represented by document data stored in the RAM 43 is written on the printing paper 18 in the letter type 1 shown in FIG. 1(a). First, when a start key (not illustrated) is switched on without operating the first and second shift distance selection keys 34, 35 and direction selection keys 36a-36h, the CPU 41 executes step S1 in which the first and second stepper motors 15, 33 are actuated to rotate the platen 11 and move the pen-holder 22, and the solenoid 21 is energized to pivot the pen-holder 22 forwardly to the writing position at which the top end of the ball-point pen 23 contacts the paper 18 at a starting position P1 indicated in FIG. 7(a). In the second step S2 the CPU 41 judges that a regular mode has been selected, from the fact that the first and second shift distance selection keys 34, 35 have not been operated, and then reads in the step S3 the first letter data in the document data stored in the RAM 43. Then, the CPU 41 goes to step S4 to control a writing operation based on the read-out letter data. When this letter data is the alphabet character "A" as shown in FIG. 7(a) the CPU 41 controls the first and second stepper motors 15, 33 and solenoid 21 so as to enable the ball-point pen 23 to write "A" on the printing paper 18 in a sequence as shown in the figure. The regular letter 1 "A" may be written on the paper 18 by the ball-point pen 23 which takes a locus shown in solid line in FIG. 7(a), due to a relative movement of the paper 18 and the ball-point pen 23 and movements of the ball-point pen toward and away from the paper 18.

After the regular letter "A" is written, the CPU 41 will move in step S5 the ball-point pen 23 which has parted from the paper 18, to the point right above the starting position P2 of the next letter. More specifically stated, the solenoid 21 is controlled to return the ball-point pen 23 to its standby position at which the writing tip of the pen 23 is spaced away from the surface of the paper 18. Subsequently, the primary and secondary stepper motors 15 and 33 are actuated to move the pen 23 to the position P2 along the locus indicated in two-dot chain line.

It is noted that sequences in writing each letter are programmed, and the driving data to operate the first and second stepper motors 15, 33 and the solenoid 21 according to the programmed sequences for each letter are stored in the ROM 42. The CPU 41 reads from the ROM 42 the driving data which corresponds to the letter data read out from the RAM 43, and controls the stepper motors 15, 33 and solenoid 21 based on the driving data.

When the ball-point pen 23 arrives at the point above the next starting position P2, the CPU 41 checks in the next step S6 whether there is still letter data representing a letter to be written in the document in question. When there is the data of the next letter, then the CPU 41 will read this letter data, to write the next letter 1 on the printing paper 18 by repeating the same writing processing as above-mentioned based on the letter data.

Hereafter, similar operations will be repeated, and the document consisting of the letters 1 of the type shown in FIG. 1(a) is written on the printing paper 18. The CPU 41 will finish the writing processing when all the letter data for writing the document data are read out and written.

Description is made next on the case where a letter represented by the document data stored in the RAM 43 is written as the shadow letters 3, as shown in FIG. 1(c), on the printing paper 18. First, when the start key (not illustrated) is switched on after selecting the shift distance and direction of the second element by operating the second shift distance selection key 35 and direction selection key 36c, the CPU 41 will operate the first and second stepper motors 15, 33 to rotate the platen 11 and move the pen-holder 22, and then energize the solenoid 21 to pivot the pen-holder 22 forwardly to the writing position at which the ball-point pen 23 contacts the printing paper 18 at the starting position P1 (step S1).

Second, the CPU 41 judges in step S7 that a special mode has been selected, from the fact that the second shift distance selection key 35 has been operated, and reads in step S8 the first letter data in the document data stored in the RAM 43. Then, the CPU 41 controls a writing operation based on the letter data, in exactly the same manner as in the regular mode aforementioned, whereby the first element consisting of the letter 1 "A" will be written on the printing paper 18 by the ball-point pen 23 (step S9). Thereafter, the CPU 41 moves the ball-point pen 23 to the next starting position P2 (step S10).

Third, based on settings of the second shift distance selection key 35 and direction selection key 36c and in order to write the second element consisting of the same letter 1 "A" at the position Q1 which is shifted by a distance corresponding to the preset distance of 2 pitches, rightward from the starting position P1 of the already written letter 1 "A", the CPU 41 moves the ball-point pen 23 to the point above the position Q1 by firstly operating the second stepper motor 33, then controls the solenoid 21 to cause the ball-point pen 23 to contact the paper in position Q1.

Then the CPU 41 starts the writing operation of the letter 1 "A" from the starting position Q1. Here the second element will be written on the printing paper 18 by the relative movement of the printing paper 18 and the ball-point pen 23 and the movements of the ball-point 23 toward and away from the printing paper 18 in exactly the same way as previously stated except the shifting of the ball-point pen by 2-pitch distance from the position where the first element has been written (step S11). Then, the CPU 41 controls the first and second stepper motors 15, 33 to move the ball-point pen 23 to the point above the position Q2 shifted 2 pitches rightward from the next starting position P2, and then move the ball-point pen 23 leftward by 2-pitch distance so as to cause the ball-point pen to move to the point above the starting position P2 of the next letter (step S12).

Accordingly, two letters 1 "A" are written on the printing paper 18 as a shadow letter 3. In other words, the shadow letter 3 comprises the two letters 1 "A" which are shifted laterally by 2-pitch distance relative to each other.

When the shadow letter 3 "A" is written, the CPU 41 checks whether letter data still exists in the aforementioned document data or not (step S13). If there is still letter data, then the CPU 41 reads the next letter data and writes the corresponding shadow letter 3 on the printing paper 18 by executing the same writing processing as aforementioned, based on the letter data.

Thereafter, the same processing will be repeated and the document consists of shadow letters 3 shown in FIG. 1(c) written on the printing paper 18. The CPU 41 finishes the writing processing when all the letter data for writing the aforementioned document data have been read out and the document wholly consisting of the shadow letters 3 has been written.

Further, when writing the document data stored in the aforementioned RAM 43 as the shadow letters 4 shown in FIG. 1(d) or as the shadow letters 5 shown in FIG. 1(e), the starting key is switched on after operating the second shift distance selection key 35 and direction selection key 36a for the former and the second shift distance selection key 35 and direction selection key 36b for the latter respectively. In this instance, the processing is exactly the same as aforementioned as far as the ball-point pen 23 is guided to the point above the next starting position P2 after having written the regular letter 1 "A". In case of the shadow letter 4, in order to write the second element consisting of the letter 1 "A" starting from the position R1 shifted in a slight degree, that is, 2-pitch distance, upward from the first element consisting of the letter 1 "A" previously written according to the setting of the direction selection key 36a, the CPU 41 controls the excitation of the solenoid 21 to cause the ball-point pen 23 to contact the position paper in R1 after locating the ball-point pen 23 above the position R1 by firstly driving the first and second stepper motors 15, 33. Further, in case of the shadow letter 5, in order to write the second element "A" starting from the position T1 shifted diagonally in right upward direction from the starting position of the first element "A" previously written according to the setting of the direction selection key 36b, the CPU 41 controls the excitation of the solenoid 21, so as to cause the ball-point pen to contact the paper in position T1 after locating the ball-point pen 23 above the position T1 by firstly driving the first and second stepper motors 15, 33.

Then the CPU 41 will start the processing for writing the second element "A" starting from the positions R1 or T1. Here the second element "A" will be written on the printing paper 18 by the relative movement of the printing paper 18 and the ball-point pen 23 and the movements of the ball-point pen 23 toward and away from the printing paper 18 in exactly the same manner as aforementioned, except that the ball-point pen 23 is shifted upward by 2-pitch distance when writing the first element "A" as the shadow letter 4, or shifted diagonally in a right-upward direction by 2-pitch distance in case of the shadow letter 5. Then, when the ball-point pen 23 moves to the position R2 shifted by the 2-pitch distance upward from the next starting position P2 in case of the shadow letter 4, or to the position T2 shifted 2 pitches diagonally upward and rightward from the position P2 in case of the shadow letter 5, the CPU 41 controls the first and second stepper motors 15, 33 to move the ball-point pen 23 so as to cause the ball-point pen to move to the point above the next starting position P2.

Accordingly, the shadow letter 4, 5 "A" comprising two regular letters 1 "A" relatively shifted as shown in FIGS. 1(d) and (e) are written on the printing paper 18. Similarly, if other direction selection keys 36d–36h are selected, the shadow letter is written with its regular letter elements shifted in the directions corresponding to such keys.

Further, in the case when the first shift distance selection key 34 is selected in place of the second shift selection key 35, the bold letter 2 will be written on the printing paper 18 by reducing the shift distance to one-pitch distance which is equal to the thickness of a line drawn by the ball-point pen 23. In this instance, the CPU 41 performs steps S8a through S13a similar to the steps S8 through S13 in the shadow letters aforementioned. However, it controls the first and second stepper motors 15, 33 to cause the starting positions of the letter 1 to be shifted by the distance equal to one pitch from the starting positions P1, P2.

It is to be understood that the present invention is not limited to the foregoing embodiment, and that modifications and variations may be made in distance of shifting of regular letter elements, in accordance with sizes of the pen, that is the thickness of the line drawn by the pen. For bold letters, it is also possible to select the shifting distance as desired within a range of the thickness of a line drawn by the pen.

Although the platen 11 is rotatably driven by the stepper motor 15 to feed the sheet of paper, it is possible that the stepper motor 15 be operatively connected to suitable means other than the platen 11, for feeding the sheet of paper supported on a stationary platen.

Further, it is appreciated that the pen-recording apparatus of the present invention be incorporated in a typewriter which is equipped with a keyboard. In this instance, a desired document entered through the keyboard is written in regular, shadow or bold letters, which are selected by selector keys on the keyboard. For example, when a bold letter selector key is depressed and a sentence is entered through the keyboard, the data corresponding to the entered characters are read from the ROM 42 and these characters are written in bold letters.

What is claimed is:

1. A pen-recording apparatus which records not only regular letters, but also special letters constituting regular letters slightly shifted relative to each other, comprising:

a platen supported on a frame to hold a printing sheet of paper;

a pen movable in an axial direction of said platen;

driving means for feeding said sheet of paper;

pen moving means for moving said pen in said axial direction;

primary control means for controlling said platen driving means and said pen moving means to cause movements of said pen and said sheet of paper relative to each other for writing on said sheet of paper a first element which is the regular letter represented by said letter data; and secondary control means for controlling said platen driving means and said pen moving means, after completion of writing said first element, to bring said pen to a starting position for writing a second element which is the same regular letter as said first element, said starting position of the second element being shifted by a predetermined distance from that of said first element, said secondary control means operating said platen driving means and said pen moving means to write said second element.

2. A pen-recording apparatus as defined in claim 1, wherein said predetermined distance is not greater than a thickness of a line drawn by said pen, whereby said first and second elements cooperate to form said special letter as a bold letter having a thickness larger than that of the regular letter.

3. A pen-recording apparatus as defined in claim 1, wherein said predetermined distance is greater than a thickness of a line drawn by said pen, whereby said first and second elements cooperate to form said special letter as a shadow letter wherein said first and second elements are at least partially superposed on each other.

4. A pen-recording apparatus as defined in claim 1, wherein after completion of writing of said first and second elements as a first special letter under control of said primary and second control means, said primary control means starts controlling the operation of said platen driving means and said pen moving means to write the first element of a next special letter adjacent to said first special letter.

5. A pen-recording apparatus as defined in claim 1, further comprising selector means for selecting one of plural directions in which said starting position of the second element is shifted from that of said first element.

6. A pen-recording apparatus as defined in claim 5, wherein said plural directions comprise eight directions having angular intervals of 45 degrees with respect to the starting position of said first element.

7. A pen-recording apparatus as defined in claim 1, further comprising selector means for selecting said predetermined distance from among plural values.

8. A pen-recording apparatus as defined in claim 5, further comprising another selector means for selecting said predetermined distance from among plural values.

9. A pen-recording apparatus as defined in claim 5, further comprising another selector means which includes at least one distance selecting key to select said predetermined distance, said selector means for selecting one of plural directions comprising plural direction selecting keys corresponding to said plural directions, said plural direction selecting keys being disposed around said at least one distance selecting key.

10. A pen-recording apparatus which records not only regular letters, but also special letters constituting regular letters slightly shifted relative to each other, comprising:

a platen supported on a frame to hold a printing sheet of paper;

a pen movable in an axial direction of said platen;

driving means for feeding said sheet of paper;

pen moving means for moving said pen in said axial direction;

memory means for storing letter data corresponding to said regular letters, said letter data for each said regular letter including data for moving said pen from a point where said pen ends the writing of each said regular letter to a point from which said pen will start writing a next regular letter;

primary control means for controlling said platen driving means and said pen moving means, according to the letter data, to cause movements of said pen and said sheet of paper relative to each other for writing on said sheet of paper a first element which is the regular letter represented by said letter data;

secondary control means for controlling said platen driving means and said pen moving means, after completion of writing said first element, to bring said pen to a starting position for writing a second element which is the same regular letter as said first element, said starting position of the second element being shifted in a predetermined direction by a predetermined distance from that of said first element, said secondary control means operating said platen driving means and said pen moving means, according to said letter data, to cause movements of said pen and said paper relative to each other for writing said second element, said pen being located, after completion of writing said second element, at a point which is shifted from the start point for writing the next regular letter by said predetermined distance in said predetermined direction; and means for operating said platen driving means and/or said pen driving means to move said pen by said predetermined distance in a direction opposite to said predetermined direction, after completion of said first and second elements of a first special letter, whereby said pen is located at a start point for writing a first element of a next special letter.

11. A pen-recording apparatus which records not only regular letters, but also special letters constituting regular letters slightly shifted relative to each other, comprising:

a platen supported on a frame to hold a printing sheet of paper;

a pen movable in an axial direction of said platen;

driving means for feeding said sheet of paper;

pen moving means for moving said pen in said axial direction;

primary control means for controlling said platen driving means and said pen moving means to cause movements of said pen and said sheet of paper relative to each other for writing on said sheet of paper a first element which is the regular letter;

secondary control means for controlling said platen driving means and said pen moving means, after completion of writing said first element, to bring said pen to a starting position for writing a second element which is the same regular letter as said first element, said starting position of the second element being shifted by a predetermined distance from that of said first element, said secondary control means operating said platen driving means and said pen moving means to write said second element;

distance selector means for selecting said predetermined distance from among a plurality of values; and direction selector means for selecting a direction in which the starting position of said second element is shifted from that of said first element.

12. A pen-recording apparatus which records not only regular letters, but also special letters constituting regular letters slightly shifted relative to each other, comprising:

a platen supported on a frame to hold a printing sheet of paper;

a pen movable in an axial direction of said platen;

driving means for feeding said sheet of paper;

pen moving means for moving said pen in said axial direction;

primary control means for controlling said platen driving means and said pen moving means to cause movements of said pen and said sheet of paper relative to each other for writing on said sheet of paper a first element which is the regular letter;

secondary control means for controlling said platen driving means and said pen moving means, after completion of writing said first element, to bring said pen to a starting position for writing a second element which is the same regular letter as said first element, said starting position of the second element being shifted by a predetermined distance from that of said first element, said second control means operating said platen driving means and said pen moving means to write said second element; and operator-controlled distance selector means for selecting said predetermined distance, an operation of said distance selector means causing said secondary control means to be operative after completion of writing said first element.

13. A pen-recording apparatus as defined in claim 11, further comprising operator-controlled direction selector means for selecting one of a plurality of directions in which the starting position of said second element is shifted from that of said first element.

* * * * *